(12) United States Patent
Lee et al.

(10) Patent No.: US 7,771,573 B2
(45) Date of Patent: Aug. 10, 2010

(54) MICROFLUIDIC DEVICE FOR ELECTROCHEMICALLY REGULATING PH OF FLUID THEREIN AND METHOD OF REGULATING PH OF FLUID USING THE MICROFLUIDIC DEVICE

(75) Inventors: Hun-joo Lee, Seoul (KR); Joon-ho Kim, Seongnam-si (KR); Chin-sung Park, Yongin-si (KR); Young-sun Lee, Seongnam-si (KR); Jong-Suk Chung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1056 days.

(21) Appl. No.: 11/489,289

(22) Filed: Jul. 19, 2006

(65) Prior Publication Data

US 2007/0017810 A1    Jan. 25, 2007

(30) Foreign Application Priority Data

Jul. 19, 2005    (KR)    ...................... 10-2005-0065433

(51) Int. Cl.
*C25B 9/00*    (2006.01)
*C02F 1/461*    (2006.01)

(52) U.S. Cl. ...................................... 204/252; 205/746

(58) Field of Classification Search ........................ None
See application file for complete search history.

(56) References Cited

U.S. PATENT DOCUMENTS

| 7,267,753 | B2 * | 9/2007 | Anex et al. | 204/600 |
| 2005/0247558 | A1 * | 11/2005 | Anex et al. | 204/275.1 |
| 2007/0034504 | A1 * | 2/2007 | Lee et al. | 204/260 |
| 2007/0138012 | A1 * | 6/2007 | Lee et al. | 204/433 |

FOREIGN PATENT DOCUMENTS

KR    10-2005-0052723    6/2005

OTHER PUBLICATIONS

"On-Chip Cell Lysis By Local Hydroxide Generation"; Authors: Dino Di Carlo, Cristian Ionescu-Zanetti, Yolanda Zhang, Paul Hung and Luke P. Lee, Dec. 2004.

* cited by examiner

*Primary Examiner*—Harry D Wilkins, III
(74) *Attorney, Agent, or Firm*—Cantor Colburn, LLP

(57) ABSTRACT

Provided is a microfluidic device for electrochemically regulating the pH of a fluid. The microfluidic device includes: an ion-exchange material; an anode chamber having a surface defined by a surface of the ion-exchange material and an anode electrode disposed along an edge of the surface of the anode chamber; and a cathode chamber having a surface defined by a surface of the ion-exchange material and a cathode electrode disposed along an edge of the surface of the cathode chamber, wherein the anode chamber and the cathode chamber are separated by an insulation material.

17 Claims, 10 Drawing Sheets a)

b)

c)

a)

b)

c)

d)

e)

f)

g)

MICROFLUIDIC DEVICE FOR ELECTROCHEMICALLY REGULATING PH OF FLUID THEREIN AND METHOD OF REGULATING PH OF FLUID USING THE MICROFLUIDIC DEVICE

CROSS-REFERENCE TO RELATED PATENT APPLICATION

This application claims the benefit of Korean Patent Application No. 10-2005-0065433, filed on Jul. 19, 2005, in the Korean Intellectual Property Office, the disclosure of which is incorporated herein in its entirety by reference.

BACKGROUND OF THE INVENTION

1. Field of the Invention

The present invention relates to a microfluidic device for electrochemically regulating the pH of a fluid therein and a method of electrochemically regulating the pH of a fluid using the microfluidic device.

2. Description of the Related Art

A microfluidic device is a device in which an inlet, an outlet, a reaction vessel, etc., are connected through microchannels. A microfluidic device also includes a micropump for transporting fluids, a micromixer for mixing fluids, and a microfilter for filtering fluids.

Such a microfluidic device is well known in the art and is used in a microanalysis device such as a lab-on-a-chip (LOC), which performs a series of biological analysis processes including cell enrichment, cell lysis, biomolecular purification, nucleic acid amplification like polymerase chain reaction (PCR), nucleic acid isolation, protein purification, hybridization, and detection. To perform the various biological analysis processes, the microfluidic device requires a different pH in each step. In the biological analysis processes, a conventional method of regulating pH is performed by adding or eliminating an acid solution, an alkaline solution, a neutralization solution, or a buffer solution. However, in this case, the microfluidic device requires a separate device and process to add or eliminate such a pH regulating solution and a sample solution is diluted. The solution injection step and the device can cause serious problems in handling materials in microvolumes and the dilution can cause problems in obtaining and amplifying a desired sample. Furthermore, since the pH regulating solution may act as an inhibitor in the subsequent biological analysis process, the pH regulating solution must be removed after being used.

In an effort to solve such problems, a method of regulating pH using electrolysis has been suggested. For example, a method of lysing cells using a device including a cathode, an anode, and a filter is disclosed in Luke P. Lee et al., Lap on a Chip, 5(2):171-178, "On-chip cell lysis by local hydroxide generation", 2005. FIG. 1 is a schematic view for explaining a conventional method of lysing cells using an electrolysis device including a filter. Referring to FIG. 1, the conventional electrolysis device includes a cathode chamber 11, an anode chamber 12, and a filter 13 interposed between the cathode chamber 11 and the anode chamber 12. Hydroxyl ions $OH^-$ are generated in the cathode 11 to increase pH, and hydrogen ions $H^+$ are generated in the anode 12 to decrease pH. Cells 16 are continuously introduced through an inlet 14 into the cathode chamber 11 to be caught by the filter 13. At this time, if electric power is supplied to the filter 13, the cells are lysed due to the increased pH, and DNA passes through the filter 13 and then the anode 12 to be discharged through an outlet 15 to a next chamber. However, since the hydroxyl ions $OH^-$ generated in the cathode chamber 11 continuously flow through the filter 13, a sufficiently high pH to achieve cell lysis cannot be maintained. Even though cell lysis occurs, separated DNA may adhere to the anode chamber 12, and thus may not advance to the next chamber.

There is another method of regulating pH using an electrolysis device including an anode chamber, a cathode chamber, and a separating membrane installed between the anode chamber and the cathode chamber. However, since the separating membrane is too thin, it is technically difficult to manufacture a microfluidic device suitable for LOCs.

SUMMARY OF THE INVENTION

The present invention provides a microfluidic device for electrochemically regulating the pH of a fluid.

The present invention also provides a method of regulating the pH of a fluid in a microfluidic device through electrolysis.

According to an aspect of the present invention, there is provided a microfluidic device for electrochemically regulating the pH of a fluid, the microfluidic device including: an ion-exchange material; an anode chamber having a surface defined by a surface of the ion-exchange material and an anode electrode disposed along an edge of the surface of the anode chamber; a cathode chamber having a surface defined by a surface of the ion-exchange material and a cathode electrode disposed along an edge of the surface of the cathode chamber; and an insulation material separating the anode chamber and the cathode chamber.

According to another aspect of the present invention, there is provided a method of electrochemically regulating the pH of a fluid in the above-described microfluidic device, the method including: introducing a solution containing ions with a lower or higher standard oxidation potential than water into the anode chamber; introducing a solution containing ions with a lower standard reduction potential than water into the cathode chamber; and applying current to the anode and cathode electrodes to cause electrolysis in the anode chamber and the cathode chamber and accordingly regulate the pH of the solutions in the anode chamber and the cathode chamber.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
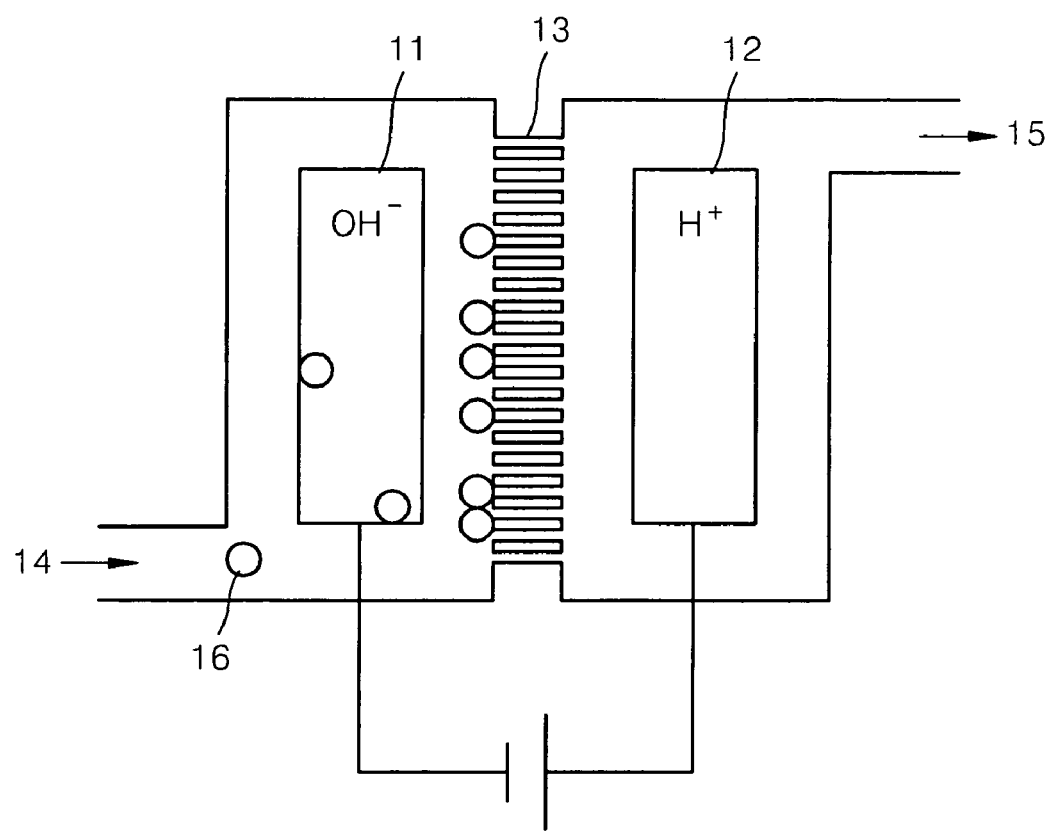
FIG. 1 is a schematic view for explaining a conventional method of lysing cells using an electrolysis device including a filter.
Figure 2A:
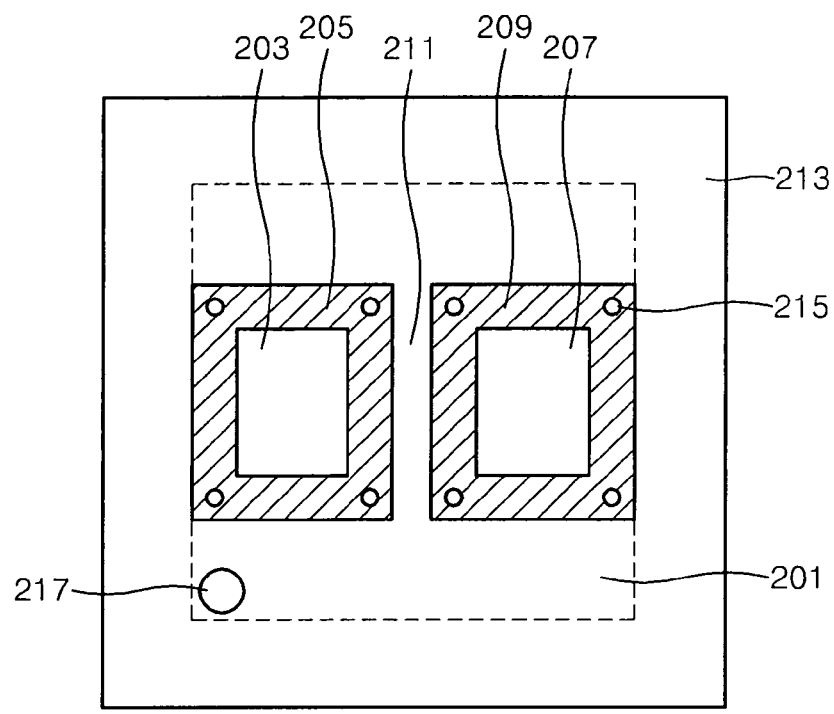
FIG. 2A is a top plan view of a microfluidic device according to an embodiment of the present invention.
Figure 2B:
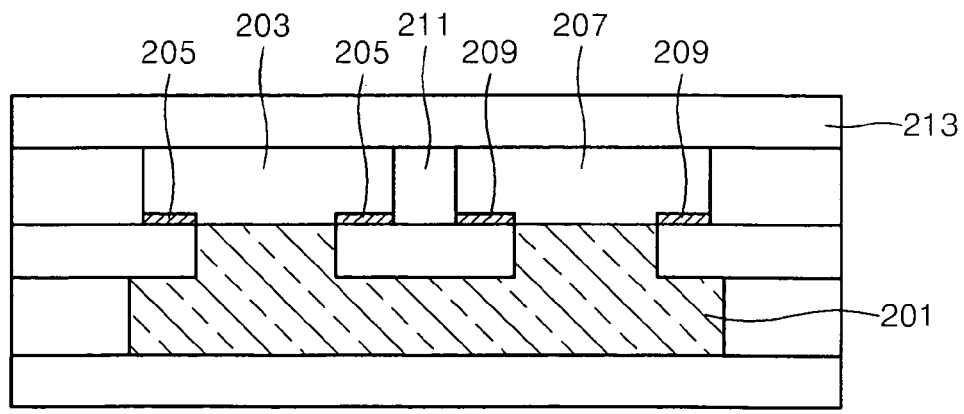
FIG. 2B is a side view of the microfluidic device of FIG. 2A.

FIG. 2A is a top plan view of a microfluidic device for electrochemically regulating the pH of a fluid according to an embodiment of the present invention. FIG. 2B is a side view of the microfluidic device of FIG. 2A.

Referring to FIGS. 2A and 2B, the microfluidic device for electrochemically regulating the pH of a fluid includes an ion-exchange material 201, an anode chamber 203 having a surface defined by a surface of the ion-exchange material 201 and an anode electrode 205 disposed along an edge of the surface of the anode chamber 203, and a cathode chamber 207 having a surface defined by the surface of the ion-exchange material 201 and a cathode electrode 209 disposed along an edge of the surface of the cathode chamber 207. The anode chamber 203 and the cathode chamber 207 are separated by an insulation material 211.

Figure 3A:
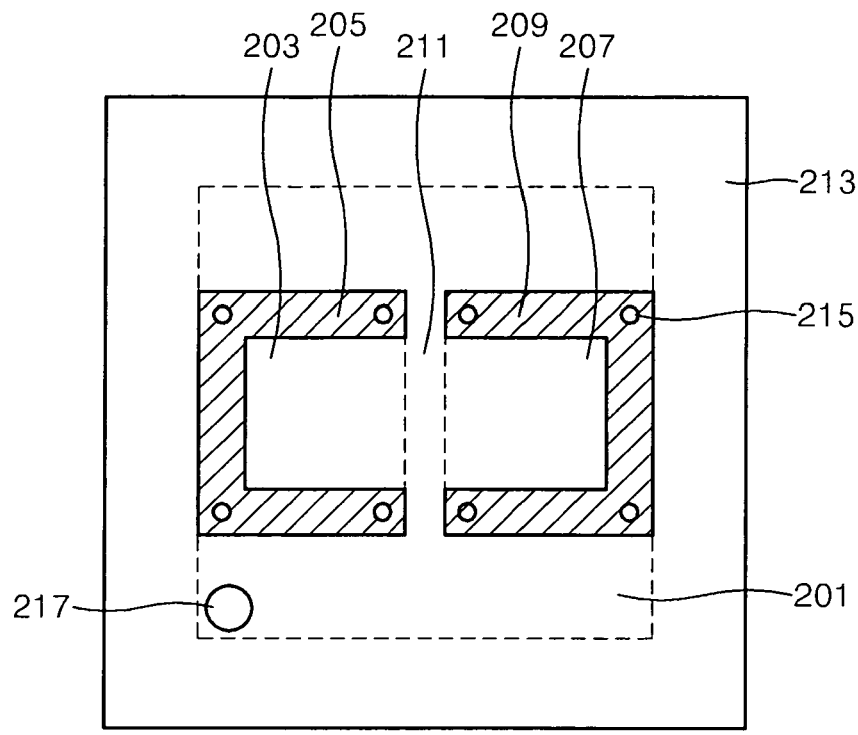
FIG. 3A is a top plan view of a microfluidic device according to another embodiment of the present invention.
Figure 3B:
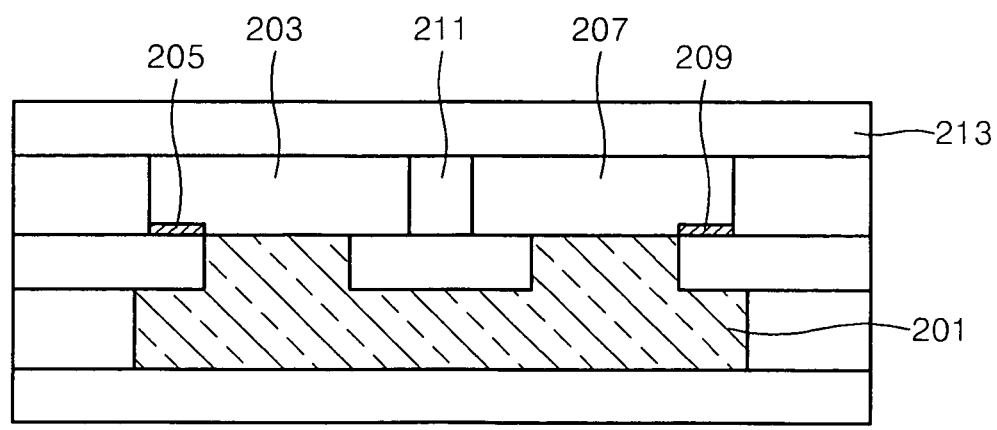
FIG. 3B is a side view of the microfluidic device of FIG. 3A.

FIG. 3A is a top plan view of a microfluidic device according to another embodiment of the present invention. FIG. 3B is a side view of the microfluidic device of FIG. 3A.

In the microfluidic device illustrated in FIGS. 3A and 3B, an anode electrode 205 and a cathode electrode 209 are respectively formed along the sides of an anode chamber 203 and a cathode chamber 207, which are formed on an ion-exchange material 201.

Each of the anode chamber 203 and the cathode chamber 207 is a space in which fluids can be contained, and may be, but is not limited to, a microchamber in which a microvolume of a material can be contained. The chamber may be selected from the group consisting of a cell lysis chamber, a nucleic acid isolation/purification chamber, a nucleic acid amplification chamber, a hybridization chamber, and a signal detection chamber. The chamber may be connected to various other chambers via microchannels. Accordingly, the microfluidic device according to the present embodiment may be configured in the form of a lap-on-a-chip (LOC) for electrochemically regulating the pH of a fluid.

The ion-exchange material 201 allows current to pass, but does not allow ions and/or gas generated from electrolysis in the anode and cathode chambers 203 and 207 to pass. In an embodiment of the present invention, the ion-exchange material 201 transmits current but blocks hydrogen ions and hydroxide ions and/or gas.

The ion-exchange material 201 may be a cation-exchange membrane or an anion-exchange membrane.

The ion-exchange membrane may be an alkali metal ion-exchange membrane. A cation-exchange membrane allows cations to flow therethrough, but not anions. On the other hand, the anion-exchange membrane allows anions to flow therethrough, but not cations. For example, the cation-exchange membrane may be a strong acid exchange membrane including $-SO_3-$ (Nafion) or a weak acid exchange membrane including $-COO-$. The anion-exchange membrane may be a strong base exchange membrane containing $N^+(CH_3)$ or a weak base exchange membrane containing $N(CH_3)_2$. The cation-exchange membrane and the anion-exchange membrane are well known in the art and can be easily bought by one of ordinary skill in the art. Examples of the ion-exchange membrane include Nafion™ (Dupont), Dowex™ (Aldrich), and Diaion™ (Aldrich).

The ion-exchange material 201 may form a membrane when crosslinking reactions are performed. In this case, the microfluidic device can be more easily manufactured.

In an embodiment of the present invention, a material disclosed in Korean Patent Application No. 2005-0,052,723, entitled "an ion-exchange mixture and a method of manufacturing the same", filed prior to the present invention by the applicant of the present invention, may be used as the ion-exchange material 201, and its disclosure is incorporated herein in its entirety by reference.

That is, the ion-exchange material 201 may be a high molecular compound composed of an anion- or cation-exchange resin, an acryamide mixture containing at least one of bis-acrylamide and acrylamide, or a copolymer obtained by an interaction between the acrylamide mixture and the high molecular compound.

The anion or cation-exchange resin may be a styrene resin, a phenol resin, an amine resin, or a methacryl resin. The anion-exchange resin may be a styrene resin substituted by trimethylamine, and the cation-exchange resin may be a styrene resin substituted by sulfonic group.

The bis-acrylamide may be N,N'-methylene-bis-acrylamide. Also, the high molecular compound, the acrylamide mixture, and the copolymer may interpenetrate one another.

Each of the anode electrode 205 and the cathode electrode 209 may be formed of a material selected from the group consisting of platinum, gold, copper, palladium, and titanium. When a Pt electrode is used in the anode chamber 203, adsorption of proteins and DNA can be prevented. When a Cu electrode is used in the anode chamber 203, the Cu reacts with a chloride, such as NaCl, in the anode chamber 203 to form $CuCl_2$, thereby reducing the generation of toxic chlorine gas. Also, when a Pd electrode is used in the anode chamber 203, the Pd absorbs hydrogen gas generated in the cathode chamber 207, and thus a gas removal process is not required.

In the present embodiment of the present invention, a solution containing ions with a higher or lower standard oxidation potential than water, that is, an electrolyte, may be introduced into the anode chamber 203. The ions with the lower standard oxidation potential than water may be one or more anions selected from the group consisting of $NO_3^-$, $F^-$, $SO_4^{2-}$, $PO_4^{3-}$, and $CO_3^{2-}$, and the ions with the higher standard oxidation potential than water may be an electrolyte containing $Cl^-$ ions, but are not limited thereto. When the anode chamber solution contains the ions with the lower standard oxidation potential than water, water in the anode chamber 203 is electrolyzed to produce oxygen gas and $H^+$ ions. In this case, the pH of the solution in the anode chamber 203 is reduced due to the increase in $H^+$ ions. The $Cl^-$ ions with the higher standard oxidation potential than water can be specially used for cell lysis only.

Alternatively, a solution containing ions with a lower standard reduction potential than water may be introduced into the cathode chamber 207. The ions may be cations such as $Na^+$, $K^+$, $Ca^{2+}$, $Mg^{2+}$, and $Al^{3+}$, but are not limited thereto. Accordingly, when water in the cathode chamber 207 is electrolyzed, hydrogen gas and OH⁻ ions are generated. In this case, the pH of the solution in the cathode chamber 207 is increased due to the increase in OH⁻ ions.

Meanwhile, referring to FIGS. 2A through 3B, the microfluidic device according to embodiments of the present invention may have vent holes 215 in a surface of the anode chamber 203 facing the anode electrode 205 and in a surface of the cathode chamber 207 facing the cathode electrode 209. Oxygen gas or hydrogen gas can be efficiently discharged through the gas vent holes 215.

Each of the anode chamber 203 and the cathode chamber 207 may include an inlet through which a solution is introduced and an outlet through which a solution is discharged. The inlet and the outlet may not be separated, with one port functioning as a combined inlet and outlet. Also, the gas vent holes may be used as the inlet and/or outlet.

Each of the anode chamber 203 and the cathode chamber 207 may include a pump for introducing and discharging a solution.

The microfluidic device may be manufactured using a general method. Preferably, the respective elements of the microfluidic device may be manufactured first and then combined.

Figure 4:
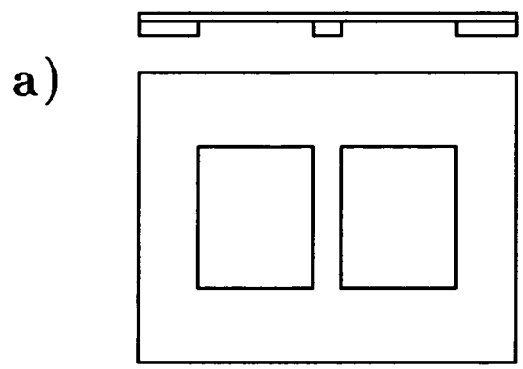
FIGS. 4A through 4C are plane views of members of the microfluidic device of FIG. 2.
Figure 4:
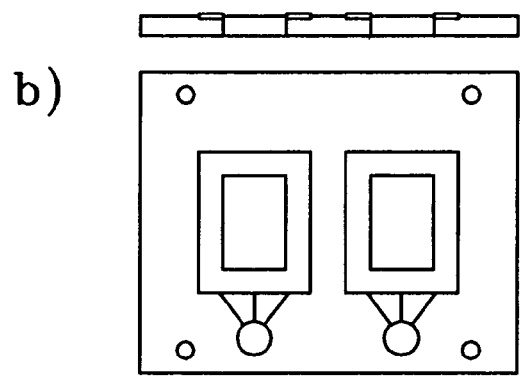
Figure 4:
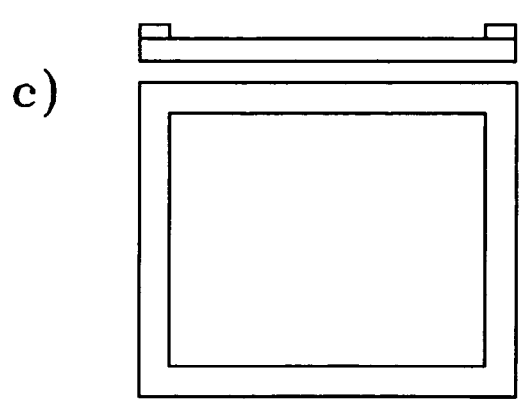

FIGS. 4A through 4C are plane views of members of the microfluidic device of FIG. 2. Referring to FIG. 4, the microfluidic device can be manufactured by manufacturing three plates and then combining the plates. The material forming each of the frames is not restricted.

Referring to FIGS. 2A through 3B, the microfluidic device further includes an ion-exchange material inlet 217. After assembling the three plates, a liquid ion-exchange material is injected to a predetermined height, preferably the height of the electrode, through the ion-exchange material inlet 217, and then is simultaneously crosslinked and formed into a membrane.

According to another aspect of the present invention, there is provided a method of electrochemically regulating the pH of a fluid in a microfluidic device. The method includes: a) injecting a solution containing ions with a lower or higher standard oxidation potential than water in an anode chamber; b) injecting a solution containing ions with a lower standard reduction potential than water in a cathode chamber; and c) applying current through an anode electrode and a cathode electrode to generate electrolysis in the anode chamber and the cathode chamber and accordingly regulate the pH of the solution in the anode chamber or the cathode chamber.

Examples of the anions with the lower standard oxidation potential than water, the anions with the higher standard oxidation potential than water, and the cations with the lower standard reduction potential than water are the same as described above. The ion introducing operations a) and b) may be performed simultaneously or sequentially.

The pH of the solution can be regulated according to the direction of the applied current, the magnitude of the applied current, the duration of the applied current, the width of each of the electrodes, and the distance between the chambers. The direction, the magnitude, and the duration of the applied current, the area of each of the electrodes, and the distance between the chambers may be varied according to the desired pH or the size of each of the chambers, and can be easily determined by one of ordinary skill in the art through experiments.

If a sample solution containing NaCl, which is most frequently used in biological sample solutions, is injected into the anode chamber and the cathode chamber, not water but chloride is electrolyzed in the anode chamber to generate chlorine gas such that the chlorine gas and water react to generate hydrogen ions, the number of which is less than that of hydroxide ions generated in the cathode chamber. Since the number of hydrogen ions vary according to the condition of the chlorine gas, it is difficult to regulate pH. To solve this problem, the microfluidic device according to an embodiment of the present invention uses a solution containing ions with a lower standard oxidation potential than water in the anode chamber and a solution containing ions with a lower standard reduction potential than water in the cathode chamber. However, for cell lysis only, a sample solution containing NaCl can be injected into the anode chamber and the cathode chamber and then electrolysis can be carried out to lyse cells in the cathode chamber.

In the method according to the present embodiment, since the cathode chamber solution contains the ions with the lower standard reduction potential than water, water is electrolyzed to generate hydrogen gas and OH⁻ ions. Since the anode chamber solution contains the ions with the lower standard reduction potential than water, water is electrolyzed to produce oxygen gas and H⁺ ions. As a result, the cathode chamber solution is basic and the anode chamber solution is acidic.

The present invention will be explained in detail with reference to the following examples. The following examples are for illustrative purposes and are not intended to limit the scope of the invention.

Example 1

Manufacture of Microfluidic Device for Regulating pH

To manufacture a microfluidic device for regulating pH according to an embodiment of the present invention, members of the microfluidic device as shown in FIGS. 4A through 4C were manufactured.

Figure 5:
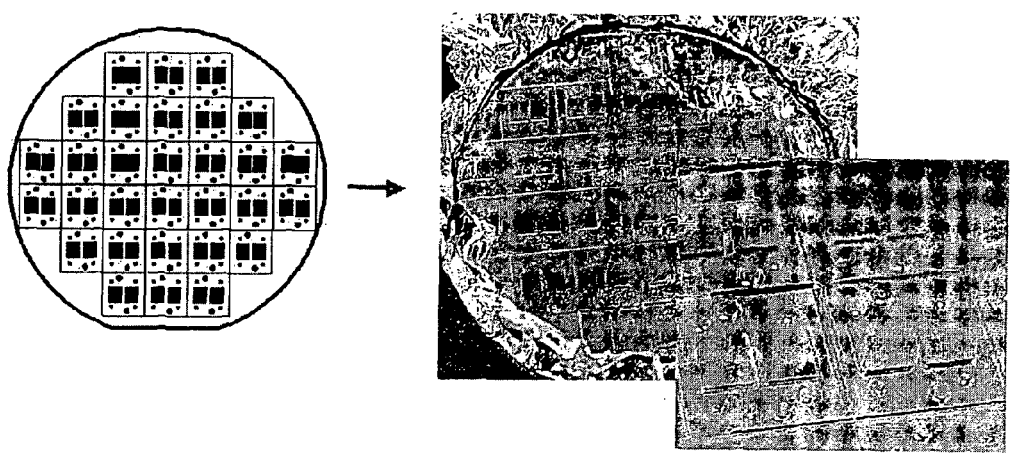
FIG. 5 illustrates a member of the microfluidic device of FIG. 4A.

FIG. 5 illustrates a member of the microfluidic device of FIG. 4A. Referring to FIG. 5, to use the member as a chamber mold, the member was formed by deep reactive ion etching (RIE) a silicon wafer having a thickness of 1000 μm to a thickness of 500 μm using an STS Multiplex system.

Figure 6:
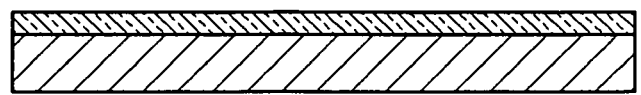
FIGS. 6A through 6G illustrate a process of manufacturing a member of the microfluidic device of FIG. 4B.
Figure 6:
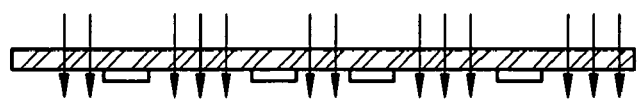
Figure 6:
Figure 6:
Figure 6:
Figure 6:
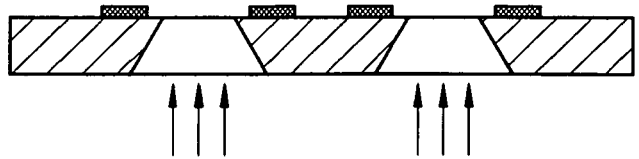
Figure 6:
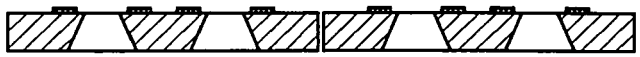

FIGS. 6A through 6G illustrate a process of manufacturing a member of the microfluidic device of FIG. 4B. Referring to FIG. 6, the member was formed using a semiconductor manufacturing process. That is, referring to FIG. 6A, a photoresist was coated on a glass substrate. Then, referring to FIGS. 6B and 6C, the product was exposed using a mask, and developed. Referring to FIG. 6D, Pt and Ti were coated on the resultant product to thicknesses of 1000 Å and 100 Å, respectively, to form electrodes. The widths of the electrodes were 1 mm, and the distance between the chambers was 1 mm. Next, referring to FIGS. 6E and 6F, the photoresist was removed and holes were formed by sandblasting. Then, referring to FIG. 6G, a dicing process was performed to manufacture the members of the microfluidic device of FIG. 4B with the structure illustrated in the first drawing of FIG. 7.

The member illustrated in FIG. 4C was cast using polydimethylsiloxane (PDMS) corresponding to the sizes of the members illustrated in FIGS. 4A and 4B.

After assembling the members of FIGS. 4A, 4B and 4C, 50 μl of a sulfonic acid group substituted styrene ion-exchange resin solution of Formula 1, 100 μl of acrylamide ($CH_2CHCONH_2$), 50 μl of bis-acrylamide ($CH_2(CH_2CHCONH)_2$), 30 μl of ammonium persulfate, and 5 μl of TEMED were poured in a mold including a predetermined frame up to the height of each of the electrode and a crosslinking process was performed at room temperature for 20 minutes. The solvents in all the solutions were ultra-pure water.

The reactants were simultaneously crosslinked and hardened, resulting in a cation-exchange material.

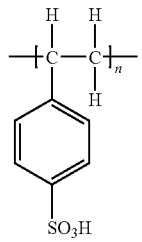

(1)

where n is an integer ranging from 2 to 100,000.

Figure 8:
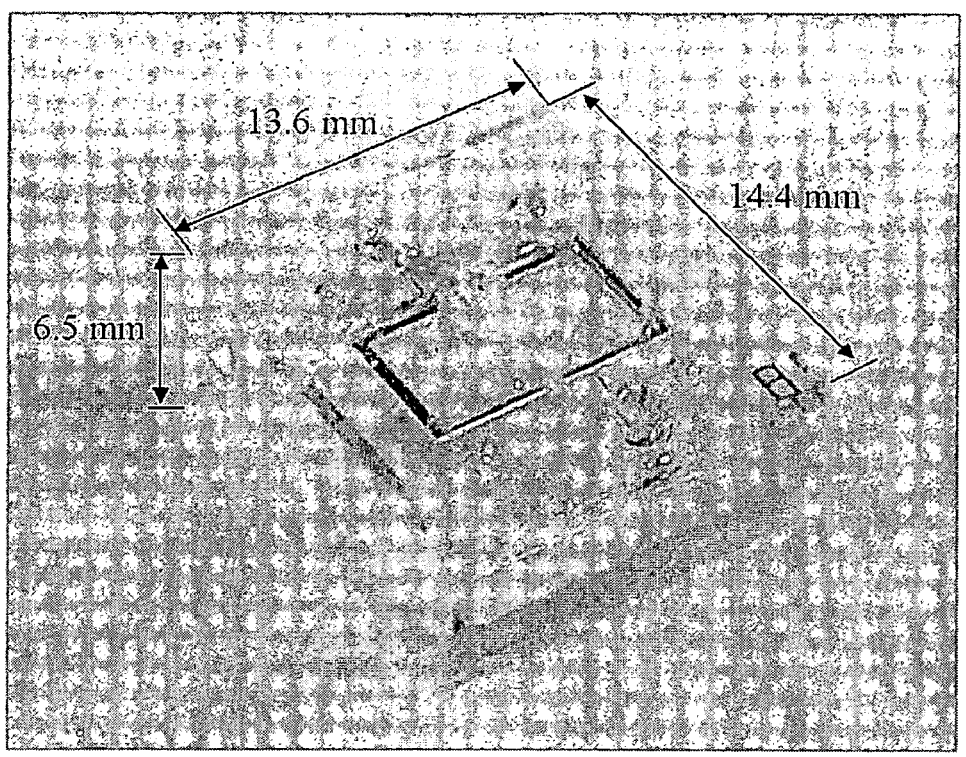
FIG. 8 is a photograph of a microfluidic device according to an embodiment of the present invention.

Through the above-described processes, a microfluidic device according to an embodiment of the present invention was manufactured. FIG. 8 is a photograph of the microfluidic device according to an embodiment of the present invention;

Examples 2 Through 8

Manufacture of Microfluidic Device for Regulating pH

Microfluidic devices were manufactured using the method of Example 1 except that the widths of the electrodes in the member of FIG. 4B, the distance between the chambers, which are shown in Table 1, and the shape of the electrodes were varied. Electrodes manufactured in Examples 1 through 4 where U-shaped, and the electrodes manufacture in Examples 5 through 8 were O-shaped.

Figure 7:
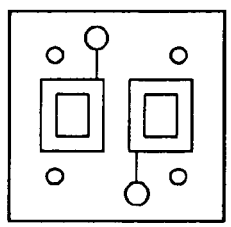
FIG. 7 illustrates various embodiments of the member of the microfluidic device of FIG. 4B.
Figure 7:
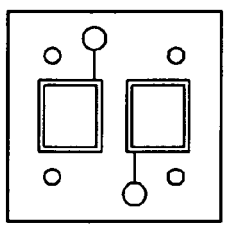
Figure 7:
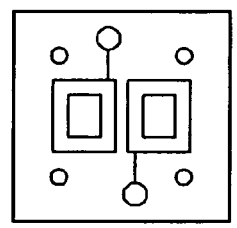
Figure 7:
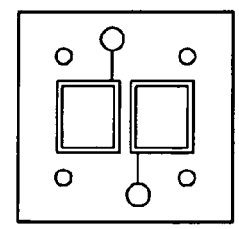
Figure 7:
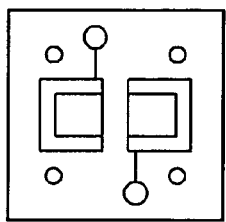
Figure 7:
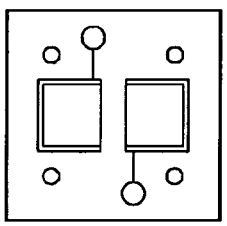
Figure 7:
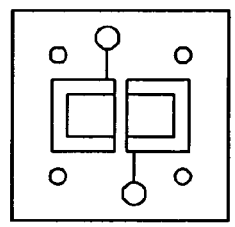
Figure 7:
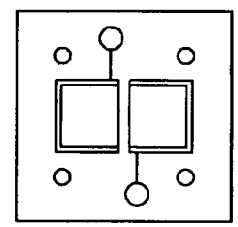

FIG. 7 illustrates the members of the microfluidic device of FIG. 4B manufactured in Examples 1 through 8. The member of FIG. 4B had various sizes and shapes as indicated in Table 1.

TABLE 1

| Examples | Electrode width (mm) | Distance between chambers (mm) |
|---|---|---|
| 1 | 1 | 1 |
| 2 | 0.5 | 1 |
| 3 | 1 | 0.5 |
| 4 | 0.5 | 0.5 |
| 5 | 1 | 1 |
| 6 | 0.5 | 1 |
| 7 | 1 | 0.5 |
| 8 | 0.5 | 0.5 |

Example 9

Measurement of Magnitude of Current when Voltage is Supplied Using Microfluidic Device The magnitude of current when supplying a voltage was measured using the microfluidic devices in Examples 1 through 8. The magnitude of current was proportional to the change in pH.

That is, each of the cathode chamber and the anode chamber of the microfluidic devices in Examples 1 through 8 was filled with a 100 mM $Na_2SO_4$ solution, a DC voltage of 5 V was applied at room temperature, and then current between the electrodes was measured.

Figure 9:
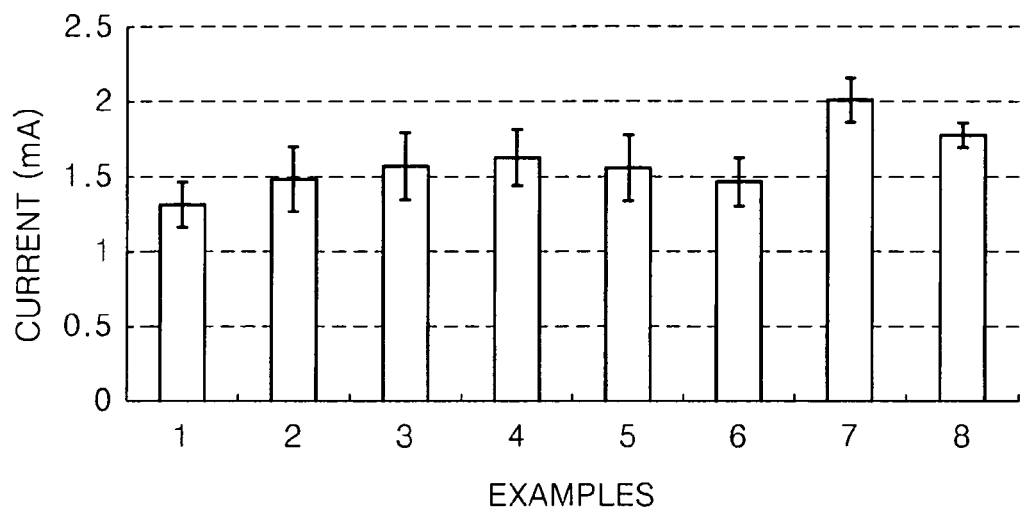
FIG. 9 is a graph current intensity when voltages are applied to microfluidic devices prepared in examples.

FIG. 9 illustrates the measured magnitude of current when a voltage was supplied using the microfluidic device. Referring to FIG. 9, the current was greater when the U-shaped electrodes were used than when the O-shaped electrodes were used. As the distance between the chambers was decreased, the current increased. When the widths of the electrodes were decreased, the current increased when the O-shaped electrodes were used. However, for the U-shaped electrodes, the current increased as the widths of the electrodes were increased.

Although there are slight differences, the current in all the microfluidic devices in Examples 1 through 8 was sufficient, and all the devices can be effectively used to regulate pH through electrolysis. In particular, the microfluidic device of Example 7 showed the greatest current intensity.

The magnitude of current is affected by the resistance of the ion-exchange material. Since the ion-exchange material functions as a conductive line, as the distance between the electrodes increased and the cross-section of the electrode material decreased, the resistance of the ion-exchange material increased and the magnitude of current decreased.

Example 10

Measurement of pH Change in the Microfluidic Device

The pH changes in the chambers of the microfluidic devices manufactured in Examples 1 through 8 were measured.

That is, cathode chambers and anode chambers of the microfluidic devices manufactured in Examples 1 through 8 were filled with a 100 mM $Na_2SO_4$ solution, a voltage of 5 V was applied for 40 seconds at room temperature, and then the pH levels of the cathode chambers and anode chambers were measured. The initial pH levels was 7 in each chamber. The results are shown in FIGS. 10A and 10B.

Figure 10A:
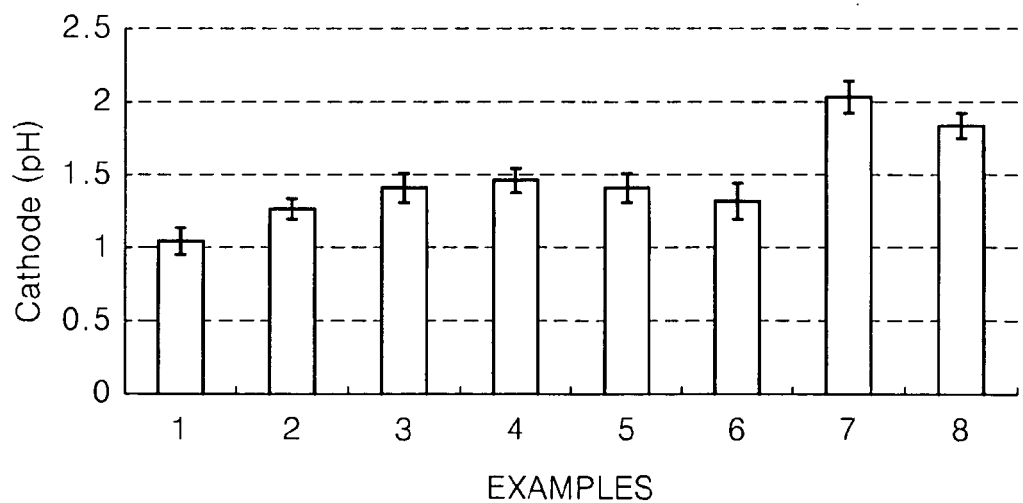
FIG. 10A is a graph of pH levels in cathode cambers after voltages are applied to the microfluidic devices prepared in the examples.
Figure 10B:
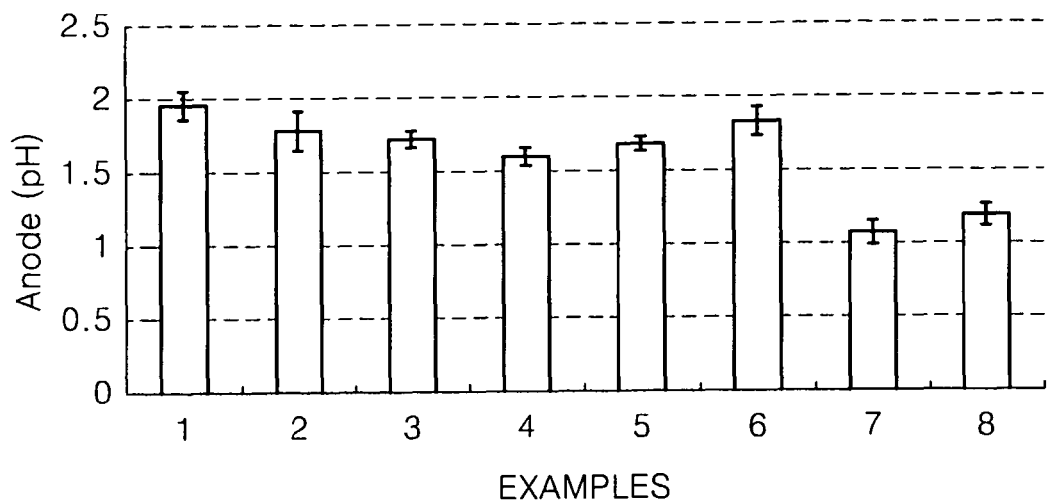
FIG. 10B is a graph of pH levels in anode cambers after voltages are applied to the microfluidic devices prepared in the examples.

FIG. 10A is a graph of the pH levels in the cathode cambers after the voltage is applied to the microfluidic devices. FIG. 10B is a graph of the pH levels in the anode cambers after the voltage is applied to the microfluidic devices. Referring to FIG. 10A, due to the 5 V applied for 40 seconds, the pH in the cathode chamber is drastically increased from 7.0 to between about 11.6 and 12.5. These results are the same as those illustrated in FIG. 9. Referring to FIG. 10B, due to the 5 V applied for 40 seconds, the pH in the anode chamber drastically decreased from 7.0 to between about 1.3 and 2.3.

From the results, it can be determined that all the microfluidic devices manufacture in Examples 1 through 8 can effectively control the pH of the solutions in the chambers.

Example 11

Measurement of Ion Separation Efficiency of Microfluidic Device

The ion separation efficiency of each of the microfluidic devices in Examples 1 through 8 was measured.

After 5 V was applied for 40 minutes under the same conditions as in Example 9, no voltage was applied for 60 seconds and a change in the pH in the cathode chamber was measured. The results are illustrated in FIG. 11.

Figure 11:
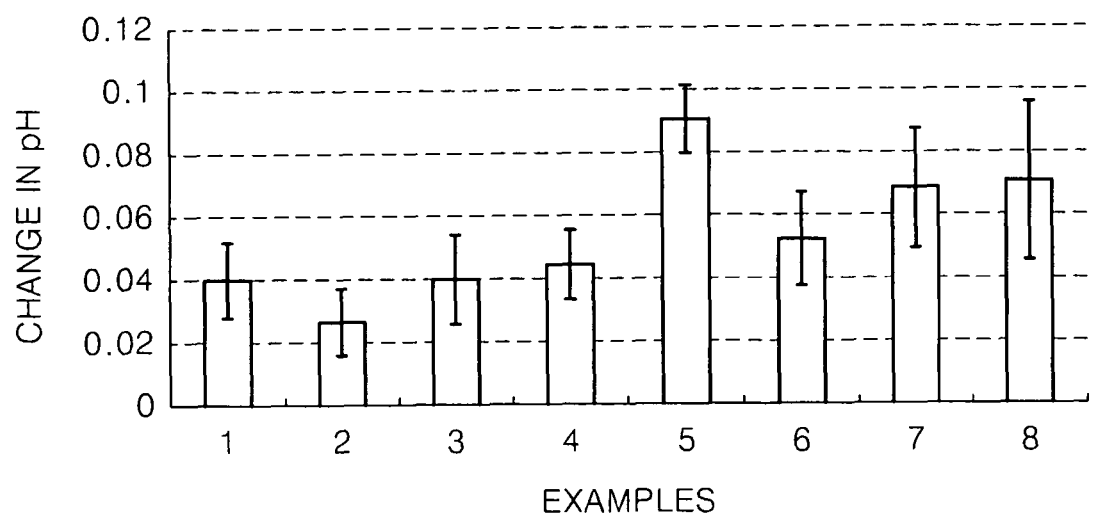
FIG. 11 is a graph of change in pH when voltage are applied to the cathode chambers of the microfluidic devices prepared in the examples and then no voltage is applied for a predetermined period of time.

Referring to FIG. 11, the pH changes in the cathode chambers of Examples 1 and 2 were approximately 0.095 and 0.07, respectively.

From these results, it can be determined that all of the microfluidic devices manufactured in Examples 1 through 8 have excellent ion separation efficiency.

Example 12

Cell Lysis Experiments Using the Microfluidic Device

Cell lysis experiments was performed using the microfluidic device manufactured in Example. 7.

A cathode chamber and an anode chamber of the microfluidic device of Example 7 were filled with 55 mM $Na_2SO_4$, and $10^5$ cells/chamber (O.D=1.0) respectively including cultures of E. coli (BL21, Stratagen), Pseudomonas putidi (Korea Research Institute of Bioscience and Biotechnology) Gram(+), Streptococcus mutans (ATCC# 25175), and Staphylococcus epidermidis (ATCC# 12228) were respectively added to the cathode chambers. Next, a DC voltage of 5 V was applied for 40 seconds at room temperature to each device so that electrolysis was performed.

As control groups, boiling was performed for cell lysis and a conventional Quiagen kit was used for cell lysis when the same quantity and kind of cells were used. The boiling involved repeating a cycle of boiling at 30° C. for 60 seconds and boiling at 95° C. for 30 seconds five times at 1×PBS.

A RT-PCR was performed using the solutions obtained in the above described processes as templates, and the amount of DNA outflowed due to the cell lysis was measured. A forward primer (sequence number 1) and a reverse primer (sequence number 2) which were identical to the four strains and complementary to 16S-rRNA were used.

Cp (crossing point) values were measured using a quantitative PCR, and then the amounts of DNA were confirmed using the difference in the Cp ($\Delta Cp$). The greater values of $\Delta Cp$, the greater the amount of DNA, indicating more effective cell lysis. The $\Delta Cp$ values are shown in Table 2.

TABLE 2

| Strain | Example 7 | Boiling method | Quiagen kit |
|---|---|---|---|
| E. coli BL21 | 7.3 | 4.9 | 4.0 |
| P. Putidi | 4.8 | — | 0.6 |
| S. epidermis | 3.9 | 2.8 | 5.8 |
| S. mutans | 3.5 | 2.4 | — |

In Table 2, "-" indicates when $\Delta Cp$ was effectively 0. In Table 2, except for the case when S. epidermis was treated using the Quiagen kit, $\Delta Cp$ was better for the microfluidic devices according to embodiments of the present invention than for the boiling method and the use of the Quiagen kit. These results show that the microfluidic devices according to embodiments of the present invention effectively control the pH level in a chamber, and thus, can effectively perform a series of biological analysis processes, including cell lysis, which require different pH values at each step.

As described above, a microfluidic device according to the present invention can rapidly regulate pH therein, and thus effectively perform a series of biological analysis processes, including cell lysis, which require different pH at each step. The microfluidic device can be easily miniaturized since the ion-exchange material forms a membrane when crosslinking reactions are performed. Moreover, the method according to the present invention can be used to regulate the pH of a fluid in the microfluidic device in a rapid and easy manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microfluidic device for electrochemically regulating the pH of a fluid, the microfluidic device comprising
   an ion-exchange material;
   an anode chamber having a surface defined by a surface of the ion-exchange material and an anode electrode disposed along an edge of the surface of the anode chamber;
   a cathode chamber having a surface defined by a surface of the ion-exchange material and a cathode electrode disposed along an edge of the surface of the cathode chamber; and
   an insulation material separating the anode chamber and the cathode chamber.

2. The microfluidic device of claim 1, wherein the ion-exchange material transmits electrons and blocks ions and gas generated through electrolysis in each chamber.

3. The microfluidic device of claim 1, wherein the ion-exchange material forms a membrane when crosslinking reactions are performed.

4. The microfluidic device of claim 3, wherein the ion-exchange material is a high molecular compound composed of an anion- or cation-exchange resin, an acryamide mixture containing at least one of bis-acrylamide and acrylamide, or a copolymer obtained through an interaction between the acrylamide mixture and the high molecular compound.

5. The microfluidic device of claim 4, wherein the anion- or cation-exchange resin is a styrene resin, a phenol resin, an amine resin, or a methacryl resin.

6. The microfluidic device of claim 4, wherein the anion-exchange resin is a styrene resin substituted by trimethylamine.

7. The microfluidic device of claim 4, wherein the cation-exchange resin is a styrene resin substituted by sulfonic group.

8. The microfluidic device of claim 4, wherein the high molecular compound, the acrylamide mixture, and the copolymer interpenetrates one another.

9. The microfluidic device of claim 1, wherein each of the anode electrode and the cathode electrode is formed of a material selected from the group consisting of platinum, gold, copper, palladium, and titanium.

10. The microfluidic device of claim 1, wherein gas vent holes are respectively formed in a surface of the anode chamber facing the anode electrode and in a surface of the cathode chamber facing the cathode electrode.

11. The microfluidic device of claim 1, wherein each of the anode chamber and the cathode chamber includes an inlet through which a solution is introduced and an outlet through which a solution is discharged.

12. The microfluidic device of claim 1, wherein each of the anode chamber and the cathode chamber includes a pump for introducing and discharging a solution.

13. A method of electrochemically regulating the pH of a fluid in the microfluidic device of claim 1, the method comprising:
   introducing a solution containing ions with a lower or higher standard oxidation potential than water into the anode chamber;
   introducing a solution containing ions with a lower standard reduction potential than water into the cathode chamber; and applying current to the anode and cathode electrodes to cause electrolysis in the anode chamber and the cathode chamber and accordingly regulate the pH of the solutions in the anode chamber and the cathode chamber.

14. The method of claim 13, wherein the ions with the lower standard oxidation potential than water are one or more ions selected from the group consisting of $NO_3^-$, $F^-$, $SO_4^{2-}$, $PO_4^{3-}$, and $CO_3^{2-}$.

15. The method of claim 13, wherein the ions with the higher standard oxidation potential than water are $Cl^-$.

16. The method of claim 13, wherein the ions with the lower standard reduction potential than water are one or more ions selected from the group consisting of $Na^+$, $K^+$, $Ca^{2+}$, $Mg^{2+}$, and $Al^{3+}$.

17. The method of claim 13, wherein the pH is regulated according to the direction of the applied current, the magnitude of the applied current, the duration of the applied current, the width of each of the anode and cathode electrodes, and the distance between the chambers.

* * * * *